Patented Aug. 1, 1939

2,167,627

UNITED STATES PATENT OFFICE 2,167,627

METHOD OF BENEFICIATING TITANIUM-BEARING SILICEOUS MINERALS

Hugh V. Alessandroni, New York, N. Y., assignor to National Lead Company, New York, N. Y., a corporation of New Jersey No Drawing. Application October 6, 1937, Serial No. 167,566

8 Claims. (Cl. 75—1)

This invention relates to a method of benficiating titano-silicate minerals and one of its objects is, among many, an improvement for economically recovering the titanium values of such ores.

Titanium, although widely distributed throughout the world in vast quantities (it is the ninth most abundant element), has found but few commercial uses. As the dioxide, $TiO_2$, it is finding ever increasing use as a white pigment but this use is in no way proportionate to the vast quantities of the element available. Among the reasons why titanium has not found more general use is the highly refractive nature of titaniferous minerals which yield their titanium constituent only after exhaustive and expensive treatments. Consequently, those industries which find a use for titanium pigment have turned to ilmenite (commonly regarded as ferrous titanate, $FeTiO_3$) which is relatively easily sulfated to give water-soluble compounds of iron and titanium, as a source of raw material and have almost completely neglected other titaniferous minerals. One such class of neglected minerals is that in which both titanium and silica are present in addition to other elements, particularly alkaline-earth metals, e. g., calcium and magnesium. The mineral sphene, corresponding more or less to the formula $CaTiSiO_5$, is representative of this class. Minerals of this class of which there are large deposits would constitute a valuable source of titanium if economical and efficient methods of recovering the titanium values were devised. The present invention sets forth one such economical and efficient method of beneficiating titano-silicate minerals to recover their titanium value.

Broadly described my invention consists essentially in treating titano-silicate minerals which also contain other elements such as alkali and alkaline-earth metals with an acid whose alkali and alkaline-earth metal salts are soluble under certain conditions of temperature and acid concentration to obtain a solution of the alkali and alkaline earth metal constituents and a residue comprising substantially all the titanium and silica originally contained in the ore; and, also includes methods for further concentrating the titanium values by removing part or all of the siliceous constituents of the residue.

My invention is based upon the discovery that minerals of the class of sphene cannot be successfully attacked with acids the alkaline-earth salts of which are insoluble in water. Consequently, such acids as sulfuric acid and phosphoric acid are unsuited for opening-up minerals of the class of sphene which consists essentially of the oxides of titanium, silicon, and calcium and may contain other elements such as aluminum, all in physical or chemical combination. However, I have found that acids whose alkaline earth metal salts are water-soluble, for example, hydrochloric acid, when employed under certain conditions of temperature and acid concentration, as will be herein set forth, may be used successfully to open-up such minerals.

In the preferred mode of practicing my invention the mineral, e. g., the sphene, is first reduced to a fine particle size, say about 200 mesh. It is then mixed with the required amount of acid whose alkaline-earth metal salts are water-soluble, e. g., hydrochloric acid, of suitable concentration. The mixing can best be carried out directly in the reaction vessel. For purposes of economy of acid the vessel should be equipped with means, such as a reflux condenser, for catching, condensing and returning to the reaction vessel vapors of the acid which may be driven from the mixture during the heating.

Because I have discovered that at high initial acid concentrations the titanium tends to be dissolved and retained in solution, the concentration of the acid should be kept so low that any of the titanium which may be dissolved will be at once hydrolyzed at the temperature employed and will be deposited as titanium hydrate. In the case of hydrochloric acid I have found that the concentration of the hydrochloric acid should not generally exceed about 12 percent nor generally be less than about 5.0 percent; that is to say, the specific gravity of the aqueous hydrochloric acid solution should not generally exceed about 1.06.

The amount of acid used should in all cases be enough to furnish sufficient negative ions to combine with all elements present in the mineral which form with the acid employed non-hydrolyzable water-soluble salts. For instance, when employing hydrochloric acid, as is preferred, and sphene, at least enough hydrochloric acid should be used to furnish sufficient chloride to combine with all alkali and alkaline-earth metals, such as calcium, magnesium, etc., and any other elements whose chlorides are non-hydrolyzable, water-soluble salts. However, in order to carry out my invention most efficiently, i. e., to obtain the maximum yield of recoverable titanium in the shortest time, the use of an amount of hydrochloric acid somewhat in excess of the above set forth minimum amount is desirable. For example, a very efficient manner of carrying out the invention is to employ 1.6 parts hydrogen chloride as 10 to 12 percent hydrochloric acid to 1.0 part of sphene, by weight.

The heating of the titano-silicate mineral with the acid should be carried out at an elevated temperature preferably at the boiling point, which in the case of 12 percent hydrochloric acid is about 107° C., until all elements present in the mineral which form water-soluble, non-hydrolyzable salts are converted into such salts and taken into solution. An average treatment of sphene with 10 to 12 percent hydrochloric acid is usually completed in about 72 hours.

When properly conducted my invention yields (1) a solution containing all elements such as calcium, magnesium, iron, manganese, etc., present in the ore and which form non-hydrolyzable water-soluble salts, and (2) a residue comprising all elements such as titanium, silicon, aluminum, etc., which either are not attacked by the acid or which form hydrolyzable salts. The residue is then preferably separated, as by filtration, decantation, etc., from the solution, washed and dried. After such treatment, the residue will be found to contain in the form of titanium hydrates substantially all or at least over 90 percent of the titanium originally present in the ore. Furthermore, the titanium is in a form which is readily tractable to prior art treatments for dissolving titanium and its hydrates. It can thus be used as a source of raw materials in the manufacture of various titanium pigments which are based on the hydrolysis of sulfuric acid solutions of titanium.

When operating on titano-silicate minerals containing polyvalent elements, such as iron, which are more readily attacked by the acid in their condition of lowest valence or which in their condition of highest valence yield hydrolyzable salts but in their condition of lowest valence non-hydrolyzable salts, it is desirable to add to the reaction mixture and to carry out the reaction in the presence of a small amount, e. g., 1.0-2.0 percent, of an acid-soluble reducing agent such as titanous chloride, $TiCl_3$, or stannous chloride $SnCl_2$. However, in such cases the quantity of reducing agent should not be so large as to reduce any appreciable amount of titanium.

Without departing from the scope of the invention, the technique of treating the titano-silicate mineral with the acid may be varied somewhat. For example, I have obtained good results when employing in a closed system the well-known counter-current principle.

I have also found it useful, although not essential to the practice of my invention to subject the titanium-bearing mineral to a preliminary heat treatment in admixture with a carbonaceous material prior to reacting it with the hydrochloric acid. For example, sphene may be roasted for about one to three hours at temperatures between 700° C and 800° C. in admixture with a small amount, say about 5 percent of powdered coke. Such a preliminary treatment in certain cases serves to render the mineral more susceptible to attack by the hydrochloric acid.

As another feature of the present invention I have discovered means whereby the titanium content of the residue obtained by carrying out that part of my invention as above described may be further concentrated by removing substantially all or part of the other constitutents of the residue, particularly the silicon constituent which is present in the form of silica, $SiO_2$. In this feature of the invention the residue is dispersed in water containing dispersing agents which act to disperse the titanium compounds to a greater degree than the silicon compounds and the other impurities and hold them in the aqueous suspension for a longer period of time than the said silicon compounds and the impurities. In this way the titanium compounds may be suspended in water while the silica and other impurities may be collected as a residue. By separating the suspended titanium compounds from the settled residue as by decantation or elutriation and then flocculating the titanium compounds and separating them from the supernatant liquor the titanium values of the ore may be further considerably concentrated and even obtained in a substantially pure state as titanium hydrates.

Among the dispersing agents useful in practicing this feature of my invention are the acid reacting halides, preferably the chlorides of aluminum, iron, cerium, zirconium, titanium and thorium, in which the metal elements are in the condition of highest valence. A small amount of the halide, between about 0.5 per cent and 5.0 per cent based on the weight of the residue is intimately mixed with water and the titanium-containing residue. The mixing should be thorough and may be obtained by mechanical agitation or milling. The amount of water should be sufficient to yield a free-flowing slurry. An amount of water between about 1.0 and 2.0 times the weight of the residue is usually sufficient. The mixing time should be adequate to produce a uniform mixture of the water and solid particles, usually a stirring or mixing time of from about one to two hours is sufficient.

When a uniform mixture of water and solid particles, in which the dispersing agent is in solution in the water, is attained, the mixture may be left to stand until the silica and other insoluble impurities settle which takes place fairly rapidly while the titanium hydrates remain in suspension. When settling has progressed to the desired extent, the aqueous supernatant suspension of the titanium hydrates is separated from the settled silica and other impurities, for example, by decantation. The titanium hydrates are then separated from the aqueous suspension as by filtration, or, if preferred, by the addition of a coagulant such as an alkali- or alkaline-reacting salt, e. g., sodium carbonate or bicarbonate or a neutral salt like sodium sulfate or an acid salt such as magnesium sulfate.

On the other hand, the uniform mixture of water and solid particles may be subjected to continuous elutriation as in a hydro-separator to remove the silica particles from the titanium hydrate particles. This is possible because the titanium hydrate particles being more completely dispersed by the dispersing agent than the silica particles carry along with the water in the elutriating process while the substantially non-dispersed silica particles tend to settle out more rapidly.

Now, in order more specifically to illustrate but not to limit my invention, the following examples are given.

Example No. 1

The titanium-bearing ore use for this example was sphene, having the following composition:

| | Percent |
|---|---|
| MgO | 1.12 |
| CaO | 18.68 |
| $SiO_2$ | 29.58 |
| $TiO_2$ | 32.0 |
| FeO | 1.43 |
| $Fe_2O_3$ | 4.20 |
| $Al_2O_3$ | 12.90 |

One hundred and fifty pounds of this mineral, finely ground, was mixed with 180 gallons of 12 percent hydrochloric (specific gravity=1.062) acid at room temperature. The mixture was slowly brought to a boil and boiled for about 48 hours. After cooling, the residue was separated by filtration from the supernatant liquor. After washing the residue analyzed:

| | Percent |
|---|---|
| TiO | 48.0 |
| $SiO_2$ | 46.2 |
| $Fe_2O_3$ | 5.7 |

The total weight of the residue was approximately 64 percent of the weight of sphene originally employed and contained about 98.8 percent of the titanium present in the ore, calculated as $TiO_2$. The residue was divided into three parts of practically equal weight.

Example No. 2

One part of the residue obtained from Example No. 1 and consisting of hydrous titanium oxide, silica and ferric oxide was mixed with a quantity of concentrated sulfuric acid chemically equivalent to the content of $TiO_2$ in the residue. The mixture was warmed to dissolve the hydrous titanium oxide. The silica was allowed to settle and the supernatant liquor removed by decantation. The liquor which contained in solution the iron and titanium was subjected to a reducing treatment using zinc dust to reduce the iron to the ferrous state and a small amount of the titanium to titanous condition. The solution was subjected to a thermal hydrolysis; the precipated hydrous titanium oxide was washed, filtered, calcined and pulverized.

The resulting product was a white pigment consisting of substantially pure titanium dioxide contaminated with only a small amount of silica.

Example No. 3

Another part of the residue obtained from Example No. 1 was treated exactly as described under Example No. 2 except that the silica was not removed from the sulfuric acid solution.

The product consisted of a composite white pigment consisting of approximately equal parts of titanium dioxide and silica.

Example No. 4

The third part of the residue obtained from Example No. 1 was mixed with water containing an amount of aluminum chloride equal to about 1.0 percent of the residue to form a free-flowing slurry and vigorously agitated for one and one-half hours. When the stirring was discontinued the silica and ferric oxide settled substantially completely out of suspension while the particles of hydrous titanium oxide remained dispersed in the water. The aqueous layer containing the dispersed hydrous titanium oxide was then carefully separated from the settled silica and iron oxide by decantation. The dispersed hydrous titanium oxide particles were flocculated by adding to the dispersion a small amount of an aqueous solution of magnesium sulfate. The flocculated hydrous titanium oxide after washing was adaptable to be calcined directly to form a useful white pigment or to serve as a starting material for the preparation of titanium salts. It could also be used in a process as described under Example No. 2.

This description of my invention is given for clearness of understanding and no undue limitations should be deduced therefrom but the appended claims should be interpreted as broadly as possible in the light of the prior art.

I claim:

1. A method of beneficiating titano-silicate mineral to recover the titanium values thereof, which comprises grinding said mineral and mixing the ground mineral with an aqueous solution of hydrochloric acid having a concentration between about 5.0 percent and about 12.0 percent and containing at least sufficient chloride to combine with all the constituents of the said mineral which are capable of forming non-hydrolyzable, hydrochloric acid-soluble salts, and heating the resulting mixture until substantially all said constituents of the said mineral are dissolved in the hydrochloric acid, and thereafter separating the resulting residue containing substantially all the titanium of the mineral.

2. A method of beneficiating titano-silicate minerals to recover the titanium values thereof, which comprises forming a mixture of ground titano-silicate mineral, an aqueous solution of hydrochloric acid having a concentration not substantially greater than 12.0 percent, and containing at least sufficient chloride to combine with all the constituents of the mineral which are capable of forming non-hydrolyzable, hydrochloric acid-soluble salts and a small amount of a hydrochloric acid-soluble reducing agent, and heating the resulting mixture until substantially all said constituents of the mineral are dissolved in the hydrochloric acid, and thereafter separating the resulting residue containing substantially all the titanium of the mineral.

3. A method as specified in claim 2, in which the reducing agent employed is selected from the group consisting of titanous chloride and stannous chloride.

4. A method as specified in claim 1, in combination with dispersing the titanium-containing residue separated from the hydrochloric acid in aqueous media, by means of a small amount of a dispersing agent capable of selectively dispersing the titanium constituents of the residue, separating the so-prepared aqueous dispersion of the titanium constituents from the substantially non-dispersed other constituents of the residue, and thereafter removing the titanium constituents from the aqueous dispersion.

5. A method as specified in claim 1, wherein the dispersed titanium constituents of the residue are separated from the non-dispersed other constituents of the residue by elutriation.

6. A method as specified in claim 1, in which the titano-silicate mineral is subjected to a heat-treatment in admixture with carbonaceous material prior to mixing with the hydrochloric acid.

7. A method as specified in claim 1, in combination with dispersing the titanium-containing residue separated from the hydrochloric acid in aqueous media by means of a small amount of a dispersing agent selected from the group consisting of the acid-reacting halides of aluminum, iron, cerium, thallium, titanium and thorium, separating the so-prepared aqueous dispersion of the titanium constituents from the substantially non-dispersed other constituents of the residue, and thereafter removing the titanium constituents from the aqueous dispersion.

8. A method as specified in claim 1, in combination with dispersing the titanium-bearing residue separated from the hydrochloric acid in aqueous media by means of a small amount of a dispersing agent capable of selectively dispersing the titanium constituents of the residue, separating the so-prepared aqueous dispersion of the titanium constituents from the substantially non-dispersed other constituents of the residue adding a small amount of a coagulating agent to the aqueous dispersion of the titanium constituents and thereafter removing the coagulated titanium constituents from the supernatant liquor.

HUGH V. ALESSANDRONI.